US011939952B2

(12) United States Patent
Michaluk et al.

(10) Patent No.: US 11,939,952 B2
(45) Date of Patent: Mar. 26, 2024

(54) OFFSHORE WIND TURBINES AND METHODS OF INSTALLING SAME

(71) Applicant: Vestas Wind Systems A/S, Aarhus N (DK)

(72) Inventors: Slawomir Michaluk, Aarhus C. (DK); Thor Thiim Hansen, Aarhus C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 18/002,541

(22) PCT Filed: Jun. 15, 2021

(86) PCT No.: PCT/DK2021/050192
§ 371 (c)(1),
(2) Date: Dec. 20, 2022

(87) PCT Pub. No.: WO2022/008015
PCT Pub. Date: Jan. 13, 2022

(65) Prior Publication Data
US 2023/0228248 A1    Jul. 20, 2023

(30) Foreign Application Priority Data
Jul. 10, 2020    (EP) ................................ 20185137

(51) Int. Cl.
*F03D 13/25*    (2016.01)
*F03D 13/30*    (2016.01)
(Continued)

(52) U.S. Cl.
CPC ............. *F03D 13/25* (2016.05); *F03D 13/30* (2016.05); *F03D 13/40* (2016.05); *F03D 80/85* (2016.05);
(Continued)

(58) Field of Classification Search
CPC .......... F03D 80/82; F03D 80/85; F03D 13/10; F03D 13/20; F03D 13/25; F03D 80/80
See application file for complete search history.

(56) References Cited

U.S. PATENT DOCUMENTS 8,664,544 B2 *  3/2014  Even .................... F03D 80/85
                                                174/72 A
9,682,846 B2 *  6/2017  Mathiasen .............. B66B 11/02
                        (Continued)

FOREIGN PATENT DOCUMENTS

DE    102016219413 A1 *  4/2018
EP        2231469 A2     9/2010
                (Continued)

OTHER PUBLICATIONS

English translation of DE102016219413A1 (Year: 2018).*
(Continued)

*Primary Examiner* — J. Todd Newton
*Assistant Examiner* — Esley Le Fisher
(74) *Attorney, Agent, or Firm* — Wood Herron & Evans LLP (57) ABSTRACT

A method of installing a wind turbine (10) at an offshore location. The wind turbine (10) includes a tower (18) and an energy generating unit (16). The tower (18) is configured to be secured to a transition piece (12, 42). Prior to shipping, the method includes electrically coupling electrical devices and/or systems (52) by cables (54) to energy generating unit (16) or wind turbine tower (18) or a test dummy therefor. The electrical devices and/or systems (52) are configured to be attached to transition piece (12, 42) once the tower (18) is installed. The method includes testing and commissioning the electrical devices and/or systems (52) while electrically coupled to the cables (54). Prior to shipping and after testing and commissioning, the method includes storing the electrical devices and/or systems (52) and attached cables (54)

(Continued)

inside the tower (18). The cables (54) are long enough to permit the electrical devices and/or systems (52) to be attached to the transition piece (12, 42) without disconnecting the electrical devices and/or systems (52) from the cables (54).

11 Claims, 5 Drawing Sheets

(51) Int. Cl.
    *F03D 13/40*     (2016.01)
    *F03D 80/80*     (2016.01)

(52) U.S. Cl.
    CPC ....... *F05B 2240/85* (2020.08); *F05B 2240/95* (2013.01); *F05B 2260/83* (2013.01)

(56) References Cited

U.S. PATENT DOCUMENTS

| | | | |
|---|---|---|---|
| 10,302,070 B2 * | 5/2019 | Donescu | F03D 13/22 |
| 10,968,897 B2 * | 4/2021 | Donescu | E02B 17/0034 |
| 2012/0168116 A1 * | 7/2012 | Mello | F03D 9/25 165/47 |
| 2022/0195996 A1 * | 6/2022 | Blaabjerg | F03D 13/10 |
| 2022/0260061 A1 * | 8/2022 | Skjaerbaek | F03D 13/10 |

FOREIGN PATENT DOCUMENTS

| | | | |
|---|---|---|---|
| EP | 2631479 A2 * | 8/2013 | F03D 1/001 |
| EP | 3222848 A1 | 9/2017 | |
| EP | 3502353 A1 | 6/2019 | |
| WO | 2009080035 A2 | 7/2009 | |

OTHER PUBLICATIONS

NPL Service Loop; Cabling: Installation & Maintenance, "S-shaped service loop saves trouble", Oct. 1, 1995 (Year: 1995).*
English translation of EP2631479A2 (Year: 2013).*
European Patent Office, European Extended Search Report issued in European Patent Application No. 20185137, dated Dec. 10, 2020.
Wagner et al., Offshore Wind: Utgrunden Leads the Way, Modern Power Systems, Wilmington Publishing, vol. 21, No. 10 Oct. 1, 2021, XP008000422.
International Searching Authority, International Search Report and Written Opinion issued in PCT Application No. PCT/DK2021/020192, dated Oct. 18, 2021.

* cited by examiner

OFFSHORE WIND TURBINES AND METHODS OF INSTALLING SAME

TECHNICAL FIELD

The invention relates generally to wind turbines, and more particularly to wind turbines for offshore installation and method of installing offshore wind turbines.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower and an energy generating unit positioned atop of the tower. The energy generating unit typically includes a nacelle to house mechanical and electrical components, such as a generator, and a rotor operatively coupled to the components in the nacelle through a main shaft extending from the nacelle. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind turbines may be constructed onshore or offshore.

The cost of installing and maintaining wind turbines at offshore locations is generally higher than comparable onshore wind turbines. The higher costs of offshore locations can be offset by the relatively larger amount of available wind energy available at sea. To produce favorable return on investment, the dimensions of offshore wind turbines are typically as large as possible, for example, rotor diameters of 100 m to 150 m are not unusual. In this way, return on investment is maximized. Still, careful planning is required for offshore installation to keep installation and operational costs to a minimum.

Construction of an offshore wind turbine begins at onshore facilities where some preassembly and testing of components of a wind turbine are completed. These preassembled portions of the wind turbine are then transported by ship to the offshore installation location. A crane on the transport ship lifts the tower, the nacelle, and rotor/blades into position onto a transition piece that extends above sea level. For example, one technique is two attach two of the blades to the rotor hub of the nacelle in a rabbit ear configuration and attach a single blade to the tower by means of a temporary fixture. At the offshore location, the nacelle and the tower are then connected to one another, and the blade attached to the tower is disconnected and then reconnected to the rotor hub. Other preassembled arrangements and installation techniques are possible.

According to each technique, the transition piece is usually installed well in advance on a foundation pile that is driven into the sea floor and extends to above sea level. The transition piece is installed on the foundation pile and is grouted in place and so provides a load-bearing structure to which the wind turbine tower, energy generating unit, and rotor are subsequently secured. The transition piece provides an access point for personnel to enter the wind turbine during installation and maintenance. For that reason, the transition piece houses electrical equipment in accordance with the builder's requirements. Because the equipment is located in the transition piece, it is easily accessible to personnel without the need to climb the wind turbine tower. The equipment on the transition piece is installed during installation of the transition piece but is typically not usable until the tower, nacelle, and rotor are installed so that electrical power is available. However, transition pieces are installed with various electrical components. These components are simply not usable until the wind turbine tower installation is complete. During installation of the wind turbine, equipment in the transition piece is electrically connected to the wind turbine. All equipment is then tested and commissioned prior to full operation of the wind turbine. While variations in construction are possible, the final assembly, testing, and commissioning of the electrical components, including the electrically equipment on the transition piece takes place at the offshore location. This technique requires considerable time of personnel and vessels, which increases offshore installation and commissioning costs.

While the above techniques are generally commercially successful, reducing time and costs of offshore installation is desirable. What is needed are offshore wind turbines and methods for their installation that reduce both installation costs and installation time.

SUMMARY

To these and other ends, a method of installing a wind turbine at an offshore location is provided. The wind turbine includes an energy generating unit and a wind turbine tower to be secured to a transition piece installed at the offshore location. Prior to shipping the wind turbine tower and the energy generating unit to the offshore location, the method includes electrically coupling one or more electrical devices and/or systems by one or more cables to electrical equipment in the energy generating unit or a test dummy for that electrical equipment in the energy generating unit or to electrical equipment in the wind turbine tower or a test dummy for that electrical equipment in the wind turbine tower. The one or more electrical devices and/or systems are configured to be attached to the transition piece once the wind turbine tower is secured to the transition piece. The method further includes onshore testing and commissioning the electrical devices and/or systems while electrically coupled to the cables. And, prior to shipping and after testing and commissioning, the method includes storing the electrical devices and/or systems and attached cables inside the wind turbine tower.

In one embodiment, after installing the wind turbine tower on the transition piece, the method further includes removing the stored electrical devices and/or systems from the wind turbine tower and attaching the electrical devices and/or systems to the transition piece.

In one embodiment, prior to storing the electrical devices and/or systems, the method further includes attaching the cables and/or the electrical devices and/or systems inside the wind turbine tower at a storage/shipping location to protect the cables and the electrical devices and/or system during shipping.

In one embodiment, following installation of the wind turbine tower on the transition piece, the method further includes detaching the cables and/or the electrical devices and/or systems from the wind turbine tower and lowering the electrical devices and/or systems from the storage/shipping location to a predetermined installation location on the transition piece without disconnecting the cables from either the electrical devices and/or systems or the energy generating unit.

In one embodiment, following installation of the wind turbine tower on the transition piece, the method further includes detaching the cables and/or the electrical devices and/or systems from the wind turbine tower and lowering the electrical devices and/or systems from the storage/shipping location to a predetermined installation location on the transition piece without re-testing and without re-commissioning the cables and/or the electrical devices and/or systems.

In one embodiment, prior to storing, the method includes winding the cables into a coil.

In one embodiment, following installation of the wind turbine tower on the transition piece, the method further includes attaching the electrical devices and/or systems to the transition piece.

In one embodiment, following testing and commissioning, no additional testing and commissioning of the electrical devices and/or systems is performed prior to operation of the wind turbine.

In one embodiment, following testing and commissioning, the cables are not disconnected from the electrical devices and/or systems.

In one embodiment, the method further includes shipping the tower and the energy generating unit to the offshore location with the electrical devices and/or systems electrically coupled to the energy generating unit and stored in the tower.

In one embodiment, the method further includes placing the cables and/or the electrical devices and/or systems in a water repellent enclosure.

According to another aspect, a wind turbine includes a wind turbine tower and an energy generating unit configured to be installed on a transition piece at an offshore location. The wind turbine further includes one or more electrical devices and/or systems electrically coupled to the energy generating unit via one or more cables. The electrical devices and/or systems and the cables are stored in the wind turbine tower to protect the cables and the electrical devices and/or systems during shipping to the offshore location. The cables are long enough permit the electrical devices and/or systems to be attached to the transition piece without disconnecting the electrical devices and/or systems from the cables.

In one embodiment, the cables are at least 3 m longer than a length of the wind turbine tower.

In one embodiment, the wind turbine further includes a water repellent enclosure, and the cables and/or the electrical devices and/or systems are stored in the water repellent enclosure.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, explain the invention.

DETAILED DESCRIPTION

Figure 1:
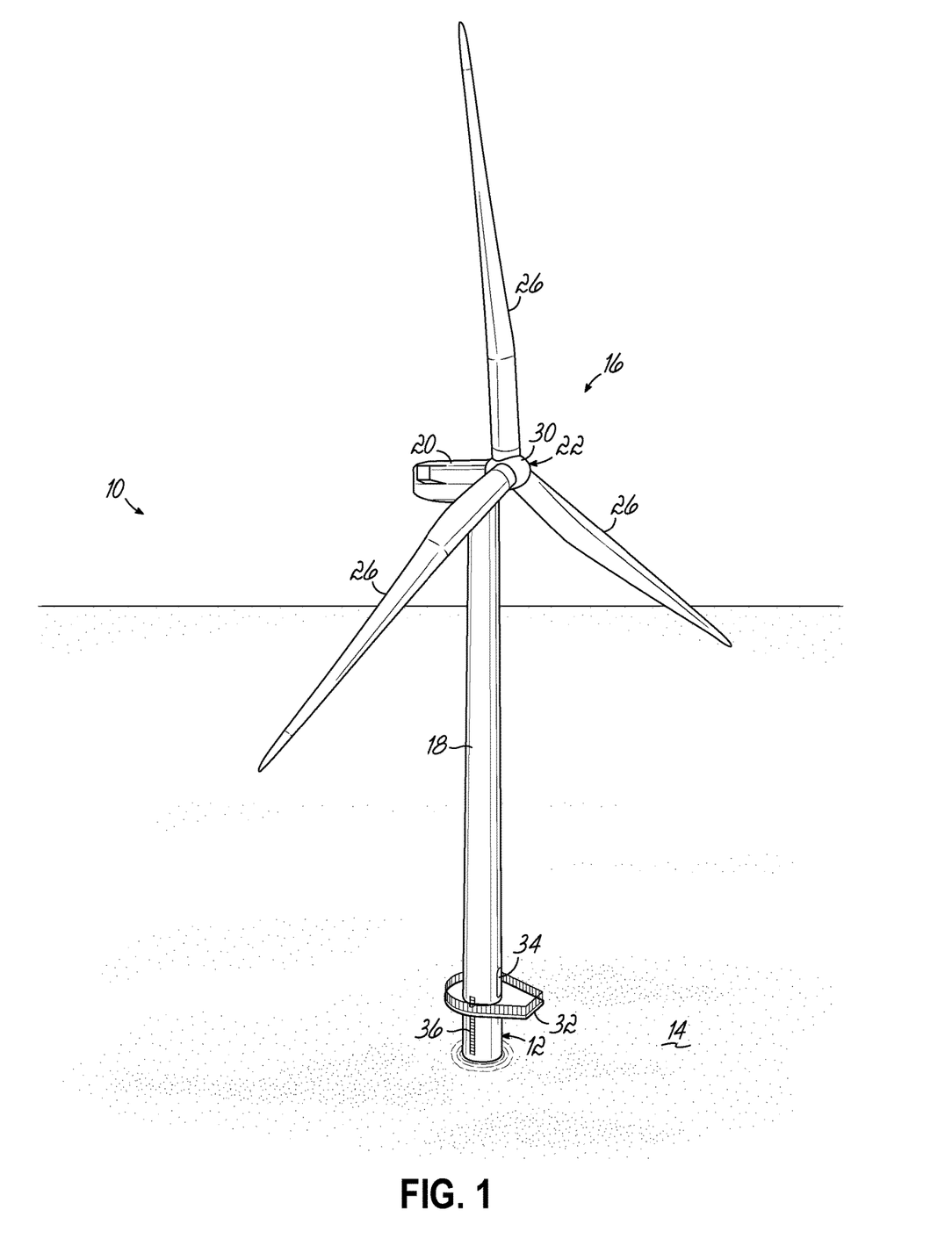
FIG. 1 is a perspective view of a wind turbine having a wind turbine tower and an energy generating unit installed at an offshore location.

To those and other ends and with reference to FIG. 1, an exemplary embodiment of the invention includes installing a wind turbine, such as the wind turbine 10, at an offshore location. As shown, the wind turbine 10 includes a transition piece 12 that extends from a foundation pile (not shown) secured in the ocean floor to a location above the ocean 14. An energy generating unit 16 is elevated above the transition piece 12 by a wind turbine tower 18. During installation, the wind turbine tower 18 is secured to the transition piece 12 at one end with the energy generating unit 16 at the other end of the wind turbine tower 18. According to embodiments of the invention, to reduce testing and commissioning time during offshore installation of the wind turbine 10, some or all electrical testing and commissioning of the wind turbine 10 is completed onshore. Generally, commissioning will occur prior to testing. For example, commissioning may include verification of cable terminations, which generally occurs prior to testing the equipment's operation.

Once all electrical equipment is commissioned and tested onshore, during installation of the wind turbine tower 18 and energy generating unit 16 at the offshore location on a transition piece, little or no commissioning or testing of electrical components is required. It is contemplated, however, that a final verification of the wind turbine tower 18 and energy generating unit 16 will be required once these components are coupled together, whether that occurs offshore or onshore. Nevertheless, the time from installation to operation of the wind turbine 10 is reduced by performing onshore commissioning and testing. In that regard, most, if not all, equipment that is found in the transition piece 12 after installation is electrically coupled to the energy generating unit 16 and/or the wind turbine tower 18. This arrangement eliminates re-commissioning and re-testing following installation of the tower 18 and/or the energy generating unit 16. This plug-and-play type of installation of equipment of the wind turbine tower 18 and energy generating unit 16 after placement in the transition piece 12 reduces the costs associated with use of transport vessels, because it reduces vessel use and advantageously reduces overall costs of installation.

Figure 2:
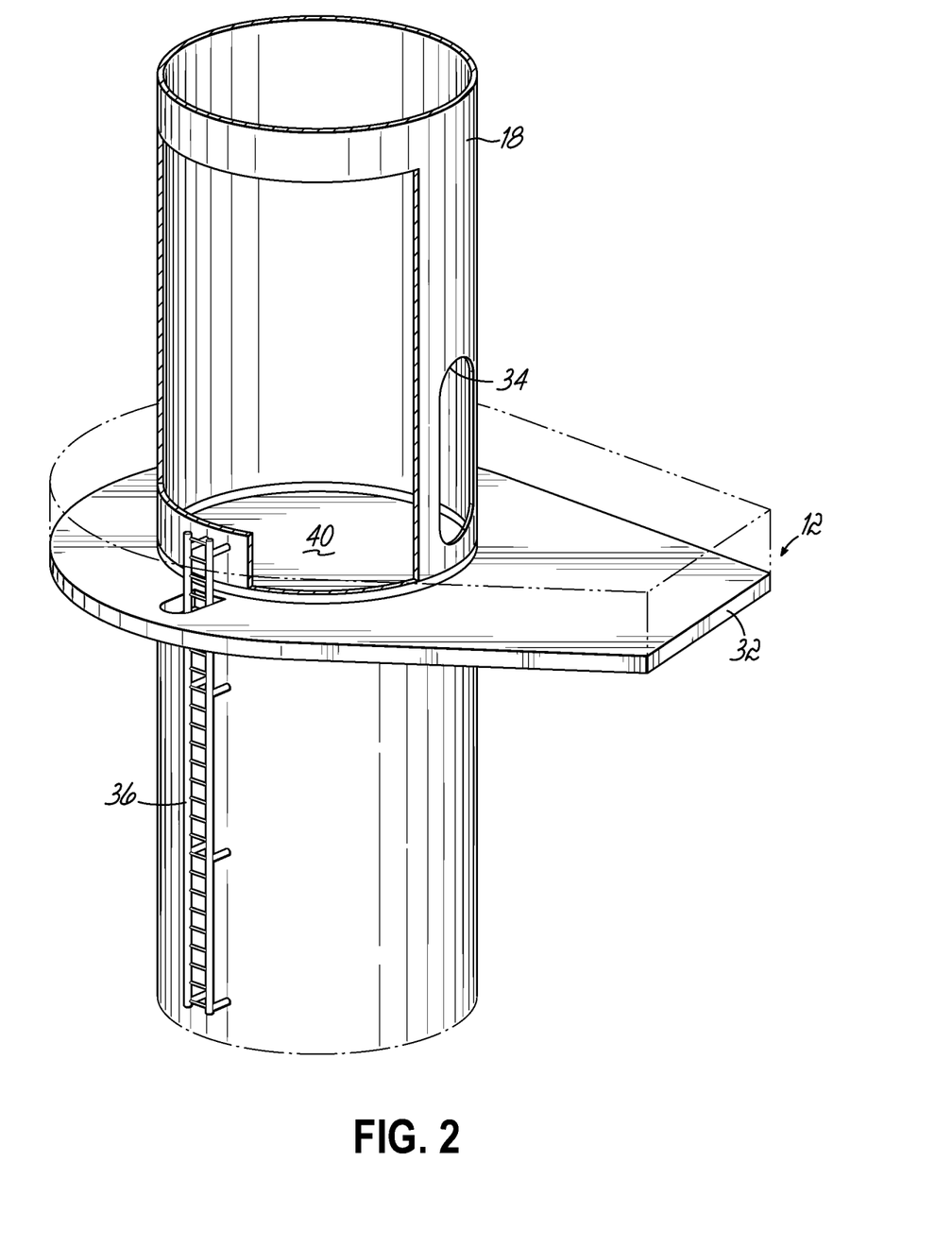
FIG. 2 is a partial sectional perspective view of a transition piece to which a wind turbine tower according to embodiments of the invention is installed.

To that end and with reference to FIGS. 1 and 2, the energy generating unit 16 includes the parts of the wind turbine 10 which transforms the kinetic energy of the wind into electrical energy. In this regard, the energy generating unit 16 typically includes a housing or nacelle 20 and a rotor 22 having a plurality of blades 26 (e.g., three blades) mounted to the central hub 30 and extending radially therefrom and a generator (not shown) for converting mechanical energy into electrical energy. The wind turbine blades 26 interact with the wind to rotate the generator. The energy generating unit 16 may further include a drive train (not shown), including a gear arrangement, interconnecting the rotor 22 and the generator. The generator and a substantial portion of the drive train may be positioned inside of the nacelle 20 of the wind turbine 10. Further, while not shown, the wind turbine tower 18 may be modular and include multiple sections that are assembled end-to-end to collectively form the wind turbine tower 18.

In addition to the generator, the nacelle 20 typically houses miscellaneous electrical equipment and components required for converting wind energy into electrical energy and various components needed to operate, control, and optimize the performance of the wind turbine 10. The generator in the nacelle 20 while producing electrical energy for commercial distribution also provides the electrical power for operation of the wind turbine 10, including electrically powering the miscellaneous components in the nacelle 20.

With continued reference to FIGS. 1 and 2, at a location above the ocean 14, the transition piece 12 provides an external platform 32 which provides an access level through which personnel may enter and leave the interior of the wind turbine tower 18. While not shown, the wind turbine tower 18 includes an internal ladder by which personnel may access the equipment in the interior of the nacelle 20. As shown in FIG. 1, the opening 34 may include a door. An external ladder 36 is accessible from the platform 32 and extends to the ocean 14. In this way, the platform 32 is reachable via the ladder 36 from a boat docked a boat landing (not shown). The transition piece 12 may also include one or more internal platforms 40 and internal ladders (not shown). The internal ladders may descend toward the ocean 14 to access one or more additional lower platforms. As described below, equipment for maintenance and operation of the wind turbine 10 may be located on the internal platform 40, on one or more of the additional lower platforms (e.g., upper work platform, switchgear platform, airtight platform, lower work platform), or in the space enclosed by the internal platform 40 and the wind turbine tower 18 following installation of the wind turbine tower 18.

Figure 3:
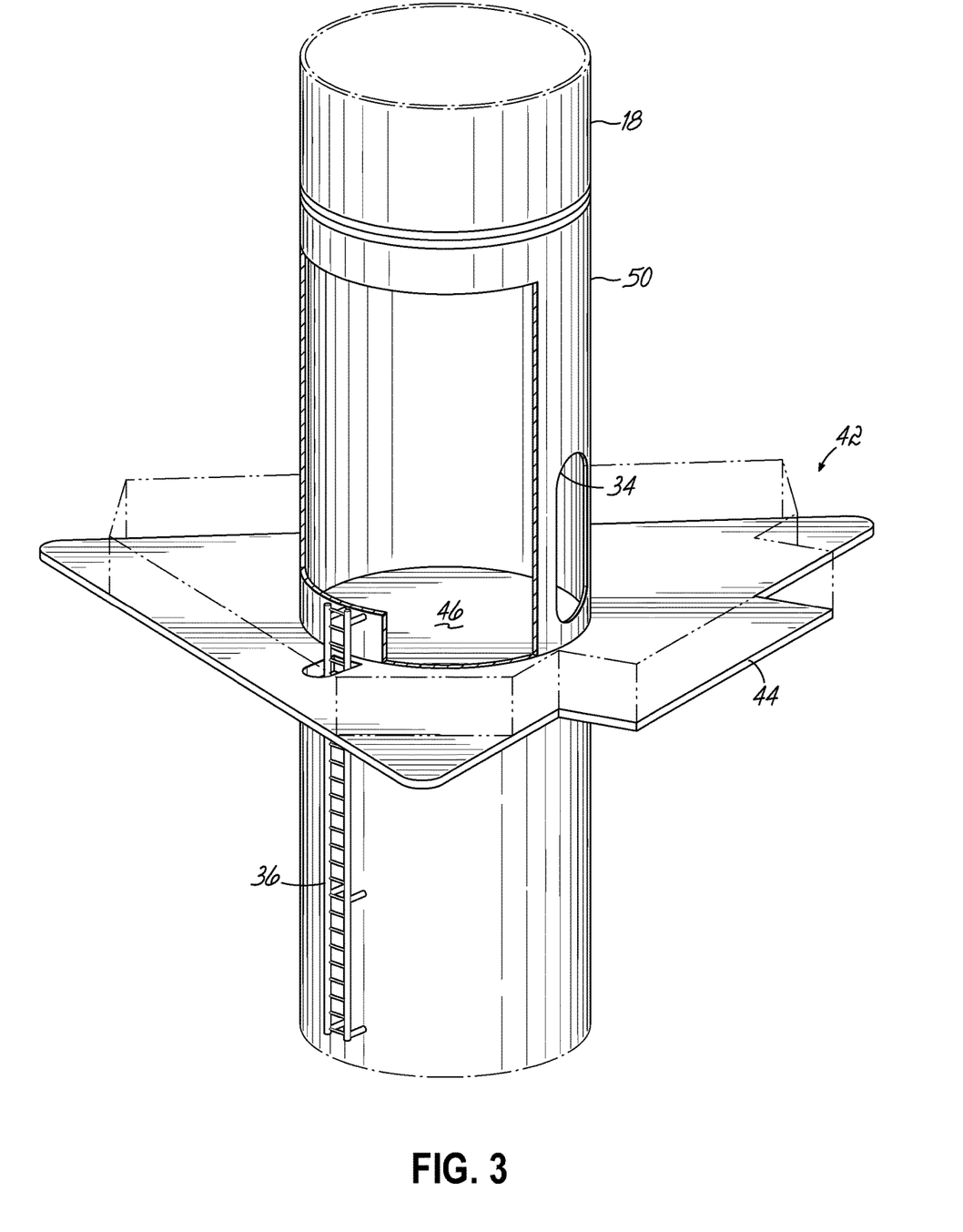
FIG. 3 is a partial sectional perspective view of an alternative transition piece to which wind turbine tower according to embodiments of the invention is installed.

Embodiments of the invention are not limited to the transition piece 12 shown and described with regard to FIG. 2. Other exemplary transition pieces may be utilized in the construction of the wind turbine 10 and in accordance with embodiments of the invention. Another such exemplary transition piece may be referred to as an extended transition piece 42 and is shown in FIG. 3. The extended transition piece 42 includes similar features as the transition piece 12. In that regard, the extended transition piece 42 includes an external platform 44 and an internal platform 46 and may include one or more internal ladders (not shown) and additional lower platforms but differs from the transition piece 12 in an extended section 50 above the platform 46. As is shown in FIG. 3, the wind turbine tower 18 is secured to the extended section 50 rather than at the elevation of the platform 32 shown, for example, in FIG. 2. As is described below, the extended section 50 may house electrical equipment necessary for the operation of the wind turbine 10.

With regard to each of the transition pieces 12 and 42, during installation of the wind turbine 10, it is not unusual for the transition piece 12, 42 to be installed in advance (e.g., up to 12 months, but normally 3 to 6 months) of installation of the wind turbine tower 18, the nacelle 20, and the rotor 22. As installed, and without the remainder of the wind turbine 10, the transition piece 12, 42 is unpowered. In other words, the transition piece 12, 42 lacks an electrical power source. Further, as is shown in FIGS. 2 and 3, in one embodiment, the transition piece 12, 42 does not include any electrical equipment. For example, the transition piece 12, 42 may not include any electrical components on the extended section 50, on the internal platform 40, 46, and/or on the external platform 32, 44.

During installation of the transition piece 12, 42, equipment needed for the operation of the wind turbine 10 is not installed on the transition piece 12, 42. For example, at the time of installation of the transition piece 12, 42 and prior to installation of the wind turbine tower 18, absent from the transition piece 12, 42 is one or more of: smoke detectors, various sensors (e.g. humidity, temperature, and door open/close for the door 34), Condition Monitoring Systems (CMS), load measurement equipment/sensors, power outlets, lights and light switches, crane control box (e.g., for davit crane), navigational aids control box, climate control devices (e.g. dehumidifiers), WIFI access point, Over Voltage Protection (OVP) box, Internet Phones, a communication system (e.g. TETRA, VHF/UHF), lock out tag out box for a lift (not shown), a Human Machine Interface (HMI) cabinet (including a light switch, emergency stop, and connection for pendant box, to name only a few. Advantageously, the lack of these devices/systems on the transition piece 12, 42 eliminates the cost associated with construction and installation of the transition piece 12, 42. The absence of equipment at the time of installation of the transition piece 12, 42 reduces the need to protect that equipment from the environment during an intervening period between installation of the transition piece 12, 42 and the installation of the wind turbine tower 18 and energy generating unit 16. Because the ocean environment is harsh on equipment, premature deterioration of equipment on the transition piece 12, 42 is avoided. There are other advantages associated with a lack of equipment in the transition piece 12, 42. These may include avoiding a need to inspect the equipment during tower installation and testing and avoiding the start of any warranty period generally initiated upon equipment installation.

However, once the wind turbine 10 is constructed, the transition piece 12, 42 may include one or more of those devices and/or systems so that these devices and/or systems are accessible and operational at the transition piece 12, 42, for example, either from the external platform 32, 44 or internal platform 40, 46. To that end, one or more electrical devices and/or systems are electrical coupled to the wind turbine 10, for example, to the generator in the nacelle 20, during preassembly at an onshore location. These electrical devices and/or systems are generally indicated by numeral 52 in FIGS. 4 and 5 and include, but are not limited to smoke detectors, electric-al breakers. control cabinets, sensors (e.g. humidity, temperature, and door open/close for the door 34), Condition Monitoring Systems (CMS), load measurement equipment/sensors, power outlets, lights and light switches, crane control box (e.g., for davit crane), navigational aids control box, climate control devices (e.g., air conditioner and/or dehumidifier), WIFI access point, Over Voltage Protection (OVP) box, Internet Phones, a communication system (e.g. TETRA, VHF/UHF), lock out tag out box for a lift (not shown), a Human Machine Interface (HMI) cabinet (including a light switch, emergency stop, and connection for pendant box) and safety systems. The electrical devices and/or systems 52 are coupled via cables 54 as necessary for operation of the wind turbine 10 and are tested and commissioned onshore prior to shipping. The cables 54 are electrical cables that function as conduits for electricity or electronic signals for electronic communication between two devices. For example, the cables 54 may be coupled to a tower controller (not shown) in the wind turbine tower 18 and electrical equipment that is intended to be placed in the transition piece 12, 42 during installation of the tower 18. The tower controller may be electrically coupled to the generator. The tower controller and electrical equipment connection may be commissioned and tested while on shore. It will be appreciated that testing and commissioning will depend on the specific equipment and to what other equipment that may be coupled. Part of commissioning is terminating cable termination/connections to each component. Commissioning may be in accordance with manufacturer's specifications. Testing may include, by way of example only, verifying proper cable connections; energizing equipment in a controlled, ordered manner; fault finding; troubleshooting; functional tests (e.g., of control panels); signal tests; and communication tests. Thus, in one embodiment, the electrical system of the wind turbine 10 is operational prior to shipping it to the offshore location. For example, the generator and electronics in the nacelle 20 are electrically connected to electrical devices and/or systems 52 that are to be installed in or on the transition piece 12, 42. Those connections are made prior to shipping them to the offshore location. Rather than electrically coupling to electrical equipment in the energy generating unit 16 and/or electrical equipment in the wind turbine tower 18 for commissioning and testing, electrical equipment may be coupled to an equivalent test dummy for one or both of the energy generating unit 16 and the wind turbine tower 18. Such a test dummy may be a test container that includes or simulates the electrical equipment found in one or both of the energy generating unit 16 and/or the wind turbine tower 18. In this way, equipment is electrically tested and commissioned prior to shipping of the wind turbine tower 18 and energy generating unit 16 even though the electrical devices and/or systems 52 are not coupled to the specific energy generating unit and/or wind turbine tower that is to be installed. Once commissioned and tested, the electrical equipment may be unplugged and shipped.

Once at the offshore location, the wind turbine tower 18 and energy generating unit 16 are installed with already commissioned electrical equipment, including equipment necessary to outfit the transition piece 12. Once the wind turbine tower 18 is coupled to the transition piece 12, 42, the equipment is lowered from the wind turbine tower 18 and coupled in position in the transition piece 12, 42. Following installation of the tower 18, the electrical equipment may be installed and plugged into their respective components whether that connection is to equipment in the energy generating unit 16 and/or in the wind turbine tower 18. At that point in time, the equipment is operational because it was previously commissioned and tested at the onshore location. During installation, according to embodiments of the invention, little or no electrical testing or commissioning of these electrical devices and/or systems 52 is required. In that case, once the wind turbine tower 18 and energy generating unit 16 are in position, the electrical devices and/or systems 52 are complete and functional.

Figure 4:
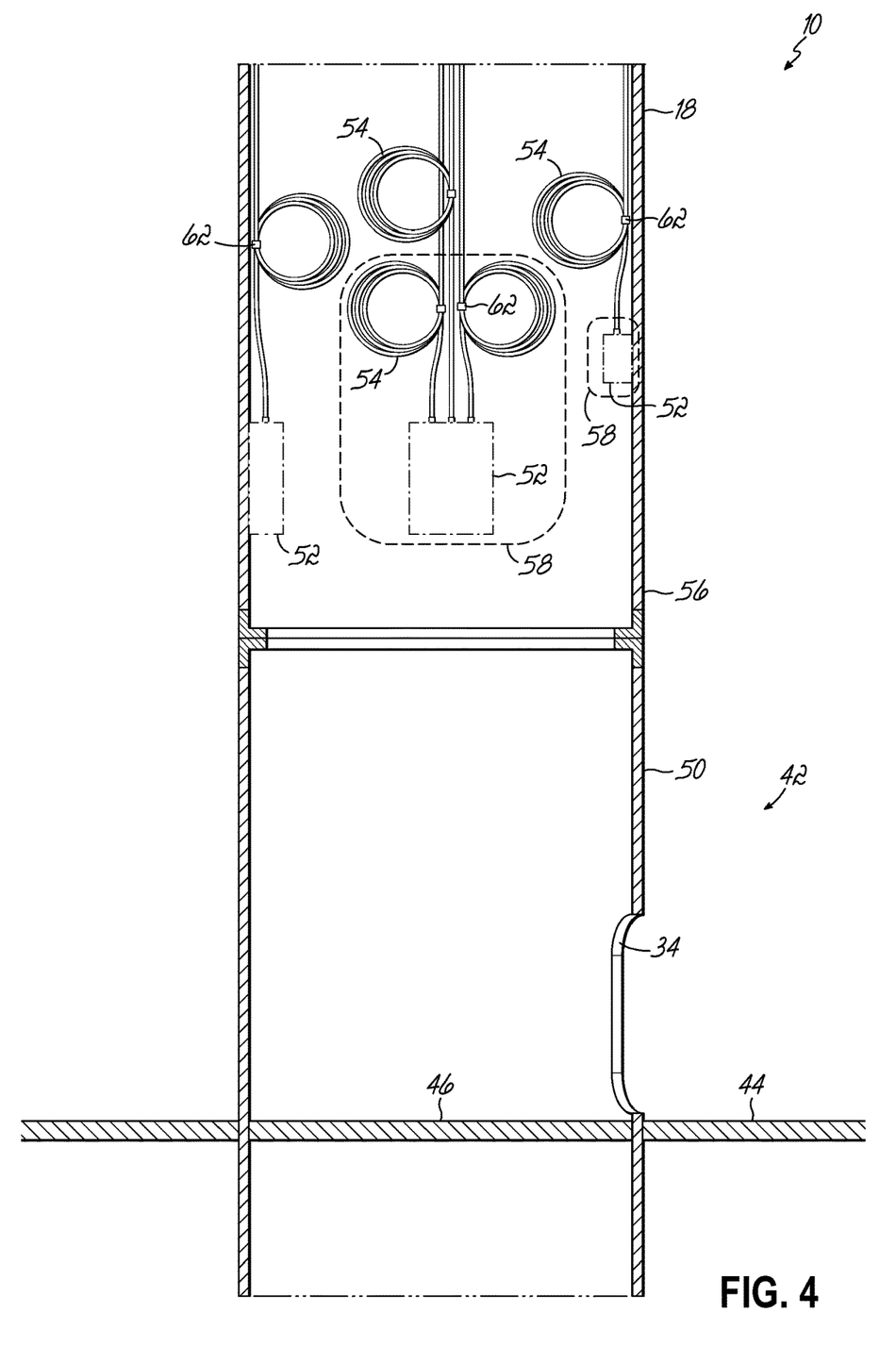
FIG. 4 is a cross-sectional view of the transition piece of FIG. 2 taken along section 4-4 showing installation of a wind turbine tower.

This is shown generally with reference to FIG. 4. After testing onshore, electrical devices and/or systems 52 (shown as boxes in phantom line), including attached cables 54, are secured within tower 18 at locations adjacent an end 56 of the wind turbine tower 18, such as under a platform nearest the end 56 or on a platform (not shown) after being passed through an opening in the platform. Openings in the platform may be adjacent dedicated cable ladders along the tower wall or for use with an internal crane. The size of the opening in the platform is determined by the largest item that is intended to be passed through it. For large openings, such as for use with a crane, a cover plate may be placed over the opening once the item is transferred through the opening. By way of example, one or both the cables 54 and the electrical devices and/or systems 52 may be temporarily secured to the tower 18 via magnets or temporary fasteners, such as after being passed through an opening. The cables 54 and/or electrical devices and/or systems 52 may be placed into a water repellent enclosure 58, such as a water-tight bag. In this way, the cables 54 and the electrical devices and/or systems 52 are protected from unintentional damage during transport and installation of the tower 18 on the transition piece 12, 42. Although not shown, each cable 54 may be a bundle of cables with several electrical cables for connecting the generator in the nacelle 20 to equipment to be installed in the transition piece 42, for example, on the extended section 50 or on the internal platform 46. The bundle may also include one or more low-voltage cables for powering auxiliary equipment inside the nacelle, such as lighting circuits, and one or more data cables for electronic communication between two devices. It will be appreciated that even though not shown, the same arrangement applies to the transition piece 12, shown in FIG. 2, particularly for connection of equipment to the internal platform 40. Further, although not shown, equipment that is to be attached to the external platform 32, 44 may also be tested and then coupled to the wind turbine tower 18 prior to shipment. And, still further, equipment that is to be attached to the transition piece 12, 42 at a lower platform below the internal platform 40, 46 may be tested and then coupled to the wind turbine tower 18 prior to shipment.

In one embodiment, the cables 54 may be attached at one end to an electrical component in the nacelle 20 and are continuous to the electrical devices and/or systems 52. That is, the cables 54 lack an electrical coupling or splice between their two ends. As an alternative, the cable 54 may be from a connection point at or near the lowest platform in the tower 18. This connection may be by way of a plug so that it may be unplugged while the electrical devices and/or systems 52 are lowered to their respective positions in the transition piece 12, 42 and then plugged back in. In one embodiment, the cables 54 are longer than the height of the lowest platform in the tower 18 from the end 56 by at least a length equal to or greater than the distance between a storage/shipping location, indicated by numeral 62 in FIG. 4, to the point of attachment on or in the transition piece 12, 42, indicated by numeral 64 in FIG. 5. By way of example only, and not limitation, the cables 54 may be 10 m to 30 m long from the nearest connection point adjacent end 56 to the point of attachment on the transition piece 12, 42. Without being limited thereto, it is believed that the length of the cable 54 should be minimized (e.g., not longer than 10 m) and cable lengths exceeding 50 m may cause handling issues.

As shown in FIG. 4, the cables 54 may be wound into a coil and temporarily attached to the tower 18. Thus, following testing and commissioning prior to shipment, after installation of the wind turbine tower 18, the cables 54 remain connected to the respective electrical devices and/or systems 52. There is no need to decouple the electrical devices and/or systems 52 from the cables 54 and then reconnect the electrical devices and/or systems 52. The electrical devices and/or systems 52 change location from the tower 18 to the transition piece 12, 42. That is, the electrical devices and/or systems 52 are moved from the shipping/storage location shown in FIG. 4 to a location in the transition piece 12, 42 shown in FIG. 5.

Figure 5:
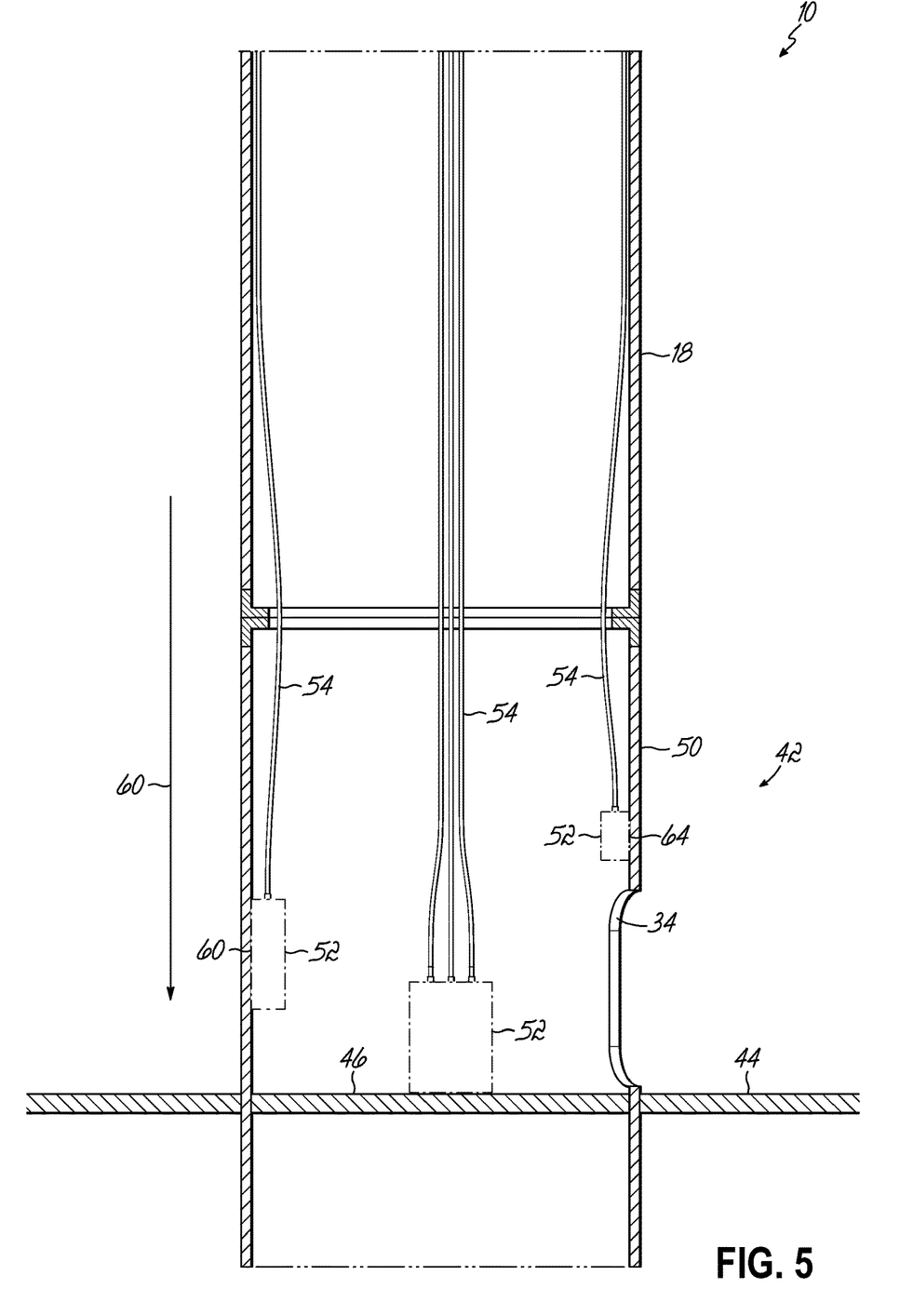
FIG. 5 is a cross-sectional view of the transition piece of FIG. 3 taken along section 4-4 showing installation of a wind turbine tower.

With reference to FIG. 5, once the wind turbine tower 18 is secured to the transition piece 12, 42, the electrical devices and/or systems 52 may be detached from their locations in the wind turbine tower 18 and lowered (as generally indicated by arrow 60) to be coupled to the transition piece 12, 42 at a predetermined installation location. Lowering the electrical devices and/or systems 52 may be facilitated by use of a net by which groups of electrical devices and/or systems 52 may be lowered simultaneously. Equipment that is to be attached to the external platform 32, 44 may also be positioned at that location. By way of example, although not shown, equipment that may be attached to the external platform 32, 44 may include a crane and lighting (e.g., flood and navigational) and other equipment to facilitate installation and maintenance of the wind turbine 10. Once attached, the electrical devices and/or systems 52 are ready to be powered with electrical power from the energy generating unit 16.

As one prophetic example, a smoke detector may be dedicated for attachment to the transition piece. However, the smoke detector is not installed on the transition piece. Instead, the smoke detector is electrically coupled to the rest of the safety systems in the tower and the energy generating unit. The smoke detector is secured in a bottom tower controller of the wind turbine generator with a longer cable. Once testing is completed and the safety system, including the smoke detector, checks out, the smoke detector is coiled up under a platform in the tower so it can be lowered into the foundation and attached with magnets to the transition piece after the tower is installed on the transition piece.

As another prophetic example, an energy generating unit HMI panel is needed at an entrance level of the transition piece for controlling the energy generating unit. The HMI panel is terminated in a bottom tower controller of the energy generating unit with a longer cable. This HMI panel is tested onshore as part of the I/O/LTPU test. Then, once testing is complete, the HMI panel and cable are coiled up under a platform in the tower so it can be lowered into the transition piece and attached with magnets.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A method of installing a wind turbine at an offshore location, the wind turbine including a wind turbine tower and an energy generating unit, the wind turbine tower is configured to be secured to a transition piece at the offshore location, the method comprising:
prior to shipping the wind turbine tower and the energy generating unit to the offshore location, electrically coupling one or more electrical devices and/or systems by one or more cables to:
electrical equipment in the energy generating unit;
electrical equipment in the wind turbine tower; or
a test dummy,
wherein the one or more electrical devices and/or systems are configured to be attached to the transition piece once the wind turbine tower is secured to the transition piece;
testing and commissioning the one or more electrical devices and/or systems while electrically coupled to the one or more cables; and
prior to shipping and after testing and commissioning, storing the one or more electrical devices and/or systems and the attached one or more cables inside the wind turbine tower.

2. The method according to claim 1, further including, after installing the wind turbine tower on the transition piece, removing the stored one or more electrical devices and/or systems from the wind turbine tower, and attaching the one or more electrical devices and/or systems to the transition piece.

3. The method according to claim 1, wherein prior to storing, the method further includes attaching the one or more cables and/or the one or more electrical devices and/or systems inside the wind turbine tower at a storage/shipping location to protect the one or more cables and the one or more electrical devices and/or system during shipping.

4. The method according to claim 3, wherein following installation of the wind turbine tower on the transition piece, the method further includes detaching the one or more cables and/or the one or more electrical devices and/or systems from the wind turbine tower and lower the one or more electrical devices and/or systems from the storage/shipping location to a predetermined installation location on the transition piece without disconnecting the one or more cables from either the one or more electrical devices and/or systems or the energy generating unit.

5. The method according to claim 1, wherein following installation of the wind turbine tower on the transition piece, the method further includes detaching the one or more cables and/or one or more the electrical devices and/or systems from the wind turbine tower and lowering the one or more electrical devices and/or systems from the storage/shipping location to a predetermined installation location on the transition piece without re-testing and without re-commissioning the one or more cables and/or the one or more electrical devices and/or systems.

6. The method according to claim 1, wherein prior to storing, the method includes winding the one or more cables into a coil.

7. The method according to claim 1, wherein following installation of the wind turbine tower on the transition piece, the method further includes attaching the one or more electrical devices and/or systems to the transition piece.

8. The method according to claim 1, wherein following testing and commissioning, no additional testing and commissioning of the one or more electrical devices and/or systems is performed prior to operation of the wind turbine.

9. The method according to claim 1, wherein following testing and commissioning, the one or more cables are not disconnected from the one or more electrical devices and/or systems.

10. The method according to claim 1, further including shipping the tower and the energy generating unit to the offshore location with the one or more electrical devices and/or systems electrically coupled to the energy generating unit and stored in the tower.

11. The method according to claim 1, wherein storing further includes placing the one or more cables and/or the one or more electrical devices and/or systems in a water repellent enclosure.

* * * * *